(12) United States Patent
Underwood et al.

(10) Patent No.: US 8,401,012 B2
(45) Date of Patent: Mar. 19, 2013

(54) PACKET ROUTING

(75) Inventors: Keith D. Underwood, Albuquerque, NM (US); Norbert Foerster, Braunschweig (DE); Thomas Gaertner, Braunschweig (DE)

(73) Assignee: Intel Corporation, Santa Clara, CA (US)

( * ) Notice: Subject to any disclaimer, the term of this patent is extended or adjusted under 35 U.S.C. 154(b) by 210 days.

(21) Appl. No.: 12/882,919

(22) Filed: Sep. 15, 2010

(65) Prior Publication Data
US 2012/0063459 A1 Mar. 15, 2012

(51) Int. Cl.
*H04L 12/28* (2006.01)
*H04L 12/56* (2006.01)
(52) U.S. Cl. .................................. 370/389; 370/400
(58) Field of Classification Search ........... 370/389–400
See application file for complete search history.

(56) References Cited

U.S. PATENT DOCUMENTS

| | | | | |
|---|---|---|---|---|
| 5,583,990 A * | 12/1996 | Birrittella et al. | ............... | 712/29 |
| 5,737,628 A * | 4/1998 | Birrittella et al. | ............... | 712/11 |
| 5,797,035 A * | 8/1998 | Birrittella et al. | ............... | 710/35 |
| 7,477,639 B2 * | 1/2009 | Shimizu et al. | ............... | 370/389 |
| 8,072,998 B2 * | 12/2011 | Sindhu et al. | ................. | 370/412 |

OTHER PUBLICATIONS

Seydim, Ayse Y., "Wormhole Routing in Parallel Computers", School of Engineering and Applied Sciences, Southern Methodist University, May, 1998, 12 pages.
Abts, et al., "Optimized Virtual Channel Assignment in the Cray XT", 2007, pp. 1-7.
Kim, et al., "Adaptive Routing in High-Radix Clos Network", Proceedings of the 2006 ACM/IEEE SC|06 Conference (SC'06), 11 pages.
Puente, et al., "Adaptive Bubble Router: a Design to Improve Performance in Torus Networks", 1999, pp. 1-10.
Adiga, et al., "Blue Gene/L torus interconnection network", IBM J. Res. & Dev., vol. 49, No. 2/3, Mar./May 2005, pp. 265-276.
Agarwal, Anant, "Limits on Interconnection Network Performance", IEEE Transactions on Parallel and Distributed Systems, vol. 2, No. 4, Oct. 1991, pp. 398-412.
Blumrich, et al., "Design and Analysis of the BlueGene/L Torus Interconnection Network", IBM Research Report, RC23025 (W0312-022), Dec. 3, 2003, Computer Science, pp. 1-10.
"Cell (microprocessor)", From Wikipedia, the free encyclopedia, retrieved on May 18, 2010, pp. 1-14, available at: http://en.wikipedia.org/wiki/Cell_(microprocessor).
Kessler, et al., "Cray T3D: A New Dimension for Cray Research", IEEE, Feb. 22-26, 1993, pp. 176-182.
Dally, et al., "Deadlock-Free Adaptive Routing in Multicomputer Networks Using Virtual Channels", IEEE Transacnons on Parallel and Distributed Systems, vol. 4, No. 4, Apr. 1993, pp. 466-475.

(Continued)

*Primary Examiner* — Ayaz Sheikh
*Assistant Examiner* — Blanche Wong
(74) *Attorney, Agent, or Firm* — Christopher K. Gagne

(57) ABSTRACT

An embodiment may include circuitry to determine, at least in part, at least one first output to which to route at least one packet, based, at least in part upon, a first output determination and a second output determination. The first output determination may select at least one second output based at least in part upon at least one deterministic output selection algorithm. The second output determination may select at least one third output based at least in part upon at least one pseudo-random output selection algorithm. The at least one pseudo-random output selection algorithm may be based, at least in part, upon a counter value. Many modifications, variations, and alternatives are possible without departing from this embodiment.

21 Claims, 10 Drawing Sheets

OTHER PUBLICATIONS

Dally, William J., "Performance Analysis of k-ary n-cube Interconnection Networks", IEEE Transactions on Computers, vol. 39, No. 6, Jun. 1990, pp. 398-412.

Dally, William J., "Virtual-Channel Flow Control", IEEE Transactions on Parallel and Distributed Systems, vol. 3, No. 2, Mar. 1992, pp. 194-205.

Duato, José et al., "A General Theory for Deadlock-Free Adaptive Routing Using a Mixed Set of Resources", IEEE Transactions on Parallel and Distributed Systems, vol. 12, No. 12, Dec. 2001, pp. 1219-1235.

Glass, et al., "The Turn Model for Adaptive Routing", Technical Report, MSU-CPS-ACS-44, Oct. 10, 1991 (revised Mar. 2, 1992), 24 pages.

Heidelberger, Philip, "Overview of the BlueGene/L Torus Network", Presentations from the "BlueGene/L Applications, Algorithms and Architectures" Workshop, Aug. 13-14, 2002, Lake Tahoe, CA, pp. 1-15.

"InfiniBand", From Wikipedia, the free encyclopedia, retrieved on May 18, 2010, pp. 1-4, available at: http://en.wikipedia.org/wiki/Infiniband.

Underwood, et al., "A Unified Algorithm for both Randomized Deterministic and Adaptive Routing in Torus Networks", submitted in Apr. 2010 for publication/presentation at the SC10 International Conference for High Performance Computing, Networking, Storage and Analysis, New Orleans, LA, Nov. 13-19, 2010, 11 pages.

Underwood, et al., "A Routing Algorithm to Improve Performance for Torus Networks", ICS Jun. 1-4, 2010 Tsukuba, Japan, 10 pages.

Glass, et al., "The Turn Model for Adaptive Routing", ACM, 1992, pp. 278-287.

Reviewers' comments (and authors' responses) for Underwood and Borch article submitted for publication to ICS, Jan. 2010, dates various, 11 pages.

Scott, et al., "Optimized Routing in the Cray T3D", Cray Research, Inc., in PCRCW '94: Proceedings of the First International Workshop on Parallel Computer Routing and Communication. London, UK: Springer-Verlag, 1994, pp. 281-294.

Scott, et al., "The Cray T3E Network: Adaptive Routing in a High Performance 3D Torus", Cray Research, Inc., HOT Interconnects IV, Stanford University, Aug. 15-16, 1996, pp. 1-10.

Alverson, Robert, "Red Storm", Red Storm Hardware Architect, Mar. 2003, pp. 1-18.

Additional reviewers' comments in Jun. 2010 for Underwood and Borch article submitted for publication in Apr. 2010, dates various, 7 pages.

* cited by examiner

PACKET ROUTING

FIELD

This disclosure relates to packet routing.

BACKGROUND

One conventional high performance computing (HPC) system consists of a plurality of nodes interconnected by routers. Each of the nodes includes one or more processors. The nodes communicate by sending messages to each other. The nodes and the routers together may define, at least in part, a network. The network's topology defines the particular nodes with which a given node may directly communicate. In order to communicate with a destination node that is not one of these particular nodes, a message from the given node traverses intermediate hops along a routing path in the network until the message is received at the destination node. The routing path is determined according to a routing algorithm.

The routing algorithm used to determine the routing path may substantially affect traffic throughput, routing path contention, and performance of the HPC system. For example, some deterministic routing algorithms produce much higher levels of routing path contention, depending upon the particular network traffic pattern, than other deterministic routing algorithms.

Adaptive routing algorithms have been proposed in which adaptive routing solutions are selected as alternatives to deterministic routing solutions. However, the adaptive routing solutions selected by such adaptive routing algorithms may collide with each other. This may significantly degrade the performance of the network and the HPC system.

Typically, the configuration of a router is fixed at its construction. Depending upon the particular router configuration and network topology, this may complicate the construction of networks having certain topologies, and/or may make it less efficient to use routers having particular configurations to construct such networks.

Furthermore, depending upon the particular network topology and routing algorithm employed, congestion issues may arise in the network. In order to try to ameliorate this condition, in the case of a torus network topology, it has been proposed to utilize an adaptive routing scheme that employs a single, dedicated virtual channel for the adaptive routing. The use of a single, dedicated virtual channel for adaptive routing reduces the routing flexibility in this solution.

BRIEF DESCRIPTION OF THE SEVERAL VIEWS OF THE DRAWINGS

Features and advantages of embodiments will become apparent as the following Detailed Description proceeds, and upon reference to the Drawings, wherein like numerals depict like parts, and in which.

Although the following Detailed Description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
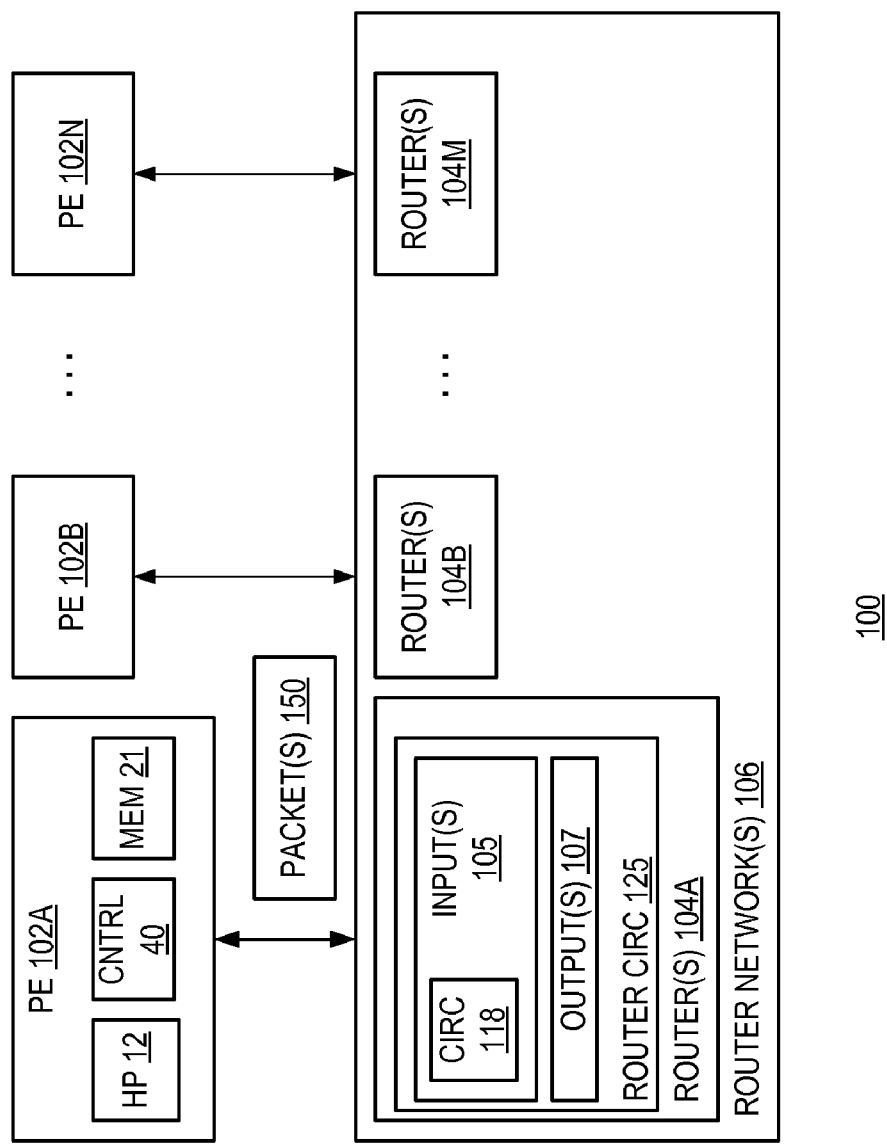
FIG. 1 illustrates a system embodiment.

FIG. 1 illustrates an HPC system embodiment 100. System 100 may include one or more (and in this embodiment, a plurality of) processing elements (PE) 102A, 102B, . . . PE 102N that are communicatively coupled to one or more router networks 106. One or more router networks 106 may comprise a plurality of routers 104A, 104B, . . . 104M. In this embodiment, each respective PE 102A, 102B, . . . 102N may be directly communicatively coupled to one or more respective routers 104A, 104B, . . . 104M, however, the respective number of PE 102A, 102B, . . . 102N may differ from the respective number of routers 104A, 104B, . . . 104M.

In this embodiment, PE 102A may comprise, for example, one or more host processors 12 that may be communicatively coupled to host computer-readable/writable memory 21 via control circuitry 40. Control circuitry 40 also may be communicatively coupled to one or more routers (e.g., one or more routers 104A). Each respective PE 102A, 102B, . . . 102N may be respectively similar in construction and/or operation.

Figure 2:
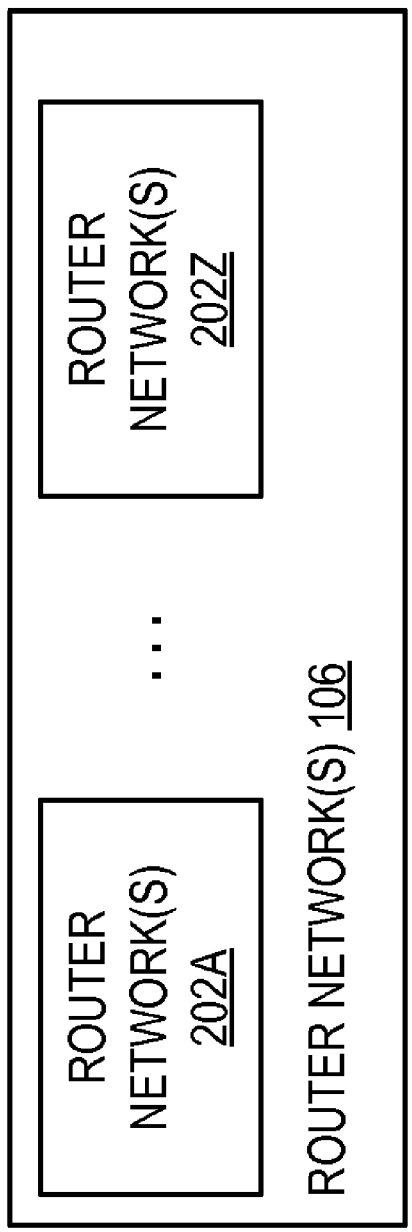
FIG. 2 illustrates one or more router networks in an embodiment.

As shown in FIG. 2, one or more router networks 106 may comprise one or more (and in this embodiment, a plurality of) router networks 202A . . . 202Z. For example, the routers 104A, 104B, . . . 104M may be communicatively coupled together so as to form, and/or operate as router networks 202A . . . 202Z. In this embodiment, each router network 202A . . . 202Z may be or comprise one or more respective portions of one or more respective Clos topology networks. In this embodiment, a Clos topology network or Clos network may be or comprise, at least in part, one or more multi-stage Clos, fat-tree, and/or folded Clos topology networks, for example, generally as described in Kim et al., "Adaptive Routing in High-Radix Clos Network," Proceedings of the 2006 ACM/IEEE SC/06 Conference (SC '06), Computer Society, Institute of Electronics and Electrical Engineers, November, 2006, 0-7695-2700-0/06. However, without departing from this embodiment, a Clos topology network or Clos network may be or comprise other and/or additional types of networks, including, for example, one or more Clos networks having lower and/or higher radices, and/or of differing configurations, at least in part.

In an embodiment, the terms "host computer," "host," "server," "client," "end station," and "intermediate station" may be used interchangeably, and may mean, for example, without limitation, one or more end stations, mobile internet devices, smart phones, media devices, input/output (I/O) devices, tablet computers, appliances, intermediate stations, network interfaces, clients, servers, and/or portions thereof. In this embodiment, a "network" may be or comprise any mechanism, instrumentality, modality, and/or portion thereof that permits, facilitates, and/or allows, at least in part, two or more entities to be communicatively coupled together, and may, but is not required to comprise one or more of such entities. Also in this embodiment, a first entity may be "communicatively coupled" to a second entity if the first entity is capable of transmitting to and/or receiving from the second entity one or more commands and/or data. In this embodiment, a "wireless network" may mean a network that permits, at least in part, at least two entities to be wirelessly communicatively coupled, at least in part. In this embodiment, a "wired network" may mean a network that permits, at least in part, at least two entities to be communicatively coupled, at least in part, non-wirelessly. In this embodiment, data and information may be used interchangeably, and may be or comprise one or more commands (for example one or more program instructions), and/or one or more such commands may be or comprise data and/or information. Also in this embodiment, an "instruction" may include data and/or one or more commands.

Also in this embodiment, "circuitry" may comprise, for example, singly or in any combination, analog circuitry, digital circuitry, hardwired circuitry, programmable circuitry, co-processor circuitry, state machine circuitry, and/or memory that may comprise program instructions that may be executed by programmable circuitry. Also in this embodiment, a processor, host processor, processor core, core, and controller each may comprise respective circuitry capable of performing, at least in part, one or more arithmetic and/or logical operations, such as, for example, one or more respective central processing units.

Memory 21, not shown computer-readable/writable memory in PE 102B . . . 102N, and/or computer-readable/writable memory in one or more routers 104A . . . 104M may comprise one or more of the following types of memories: semiconductor firmware memory, programmable memory, non-volatile memory, read only memory, electrically programmable memory, random access memory, flash memory, magnetic disk memory, optical disk memory, and/or other or later-developed computer-readable and/or writable memory. One or more machine-readable program instructions may be stored in such memory. These instructions may be accessed and executed by one or more host processors in PE 102A, 102B, . . . 102N, one or more routers 104A, 104B, . . . 104N, and/or one or more portions and/or components thereof. When so executed, these one or more instructions may result in these one or more host processors, one or more routers, and/or one or more components thereof, performing operations described herein as being performed by these components of system 100.

In an embodiment, a portion, subset, or fragment of an entity may comprise all of, more than, or less than the entity. Also in an embodiment, a packet may comprise one or more symbols and/or values. Additionally, in an embodiment, a value and/or algorithm may be "predetermined" if the value and/or algorithm, at least in part, and/or one or more values, algorithms, operations, and/or processes comprised and/or involved, at least in part, in generating and/or producing the value, and/or in implementation and/or execution of the algorithm, is or are predetermined, at least in part. In this embodiment, an algorithm may comprise one or more processes, operations, techniques, computations, and/or calculations involved in, facilitating, comprised in, and/or for the purpose of producing and/or generating, at least in part, a useful result. Also in an embodiment, a port or port circuitry may comprise circuitry capable of receiving, at least in part, storing, at least in part, and/or transmitting, at least in part, one or more packets.

In this embodiment, each of the routers 104A . . . 104M may have a respectively similar construction and/or operation. For example, router 104A may comprise operative router circuitry 125 that may comprise one or more (and in this embodiment, a plurality of) inputs 105, and one or more (and in this embodiment, a plurality of) outputs 107. In this embodiment, circuitry 118 may be replicated, at least in part, at each of the inputs 105. For example, each of the inputs 105 may comprise a respective replicated copy, at least in part, of circuitry 118. The respective outputs and inputs of routers 104A . . . 104M may be coupled together in such a way as to construct router networks 202A . . . 202Z and one or more router networks 106.

In this embodiment, a router may comprise circuitry (such as, for example, circuitry 125) that is capable of routing, at least in part, a packet. In this embodiment, the routing of a packet may comprise, at least in part, transmitting, at least in part, a packet toward a destination. Also in this embodiment, a hop may comprise one or more nodes, or one or more portions thereof, from, to, and/or via which a packet may be routed. In this embodiment, a node may comprise, for example, one or more entities in a network, such as, for example, processors, one or more PE, and/or one or more respective routers to which the one or more PE may be directly communicatively coupled. In this embodiment, input and input port may be used interchangeably, and may mean circuitry capable, at least in part, of receiving at least one portion of a packet. Also in this embodiment, output and output port may be used interchangeably, and may mean circuitry capable, at least in part, of transmitting at least one packet. Additionally, in this embodiment, port and port circuitry may be used interchangeably, and may mean circuitry capable, at least in part, of transmitting and/or receiving at least one packet. Of course, many alternatives, variations, and modifications of the foregoing are possible without departing from this embodiment.

In operation, one or more host processors 12 may generate, at least in part, one or more packets 150 that are destined for one or more PE (e.g., PE 102N), for example, for processing by one or more host processors comprised in PE 102N. One or more packets 150 may be issued from PE 102A by control circuitry 40, and may be received, at least in part, by one or more routers 104A.

At router 104A, one or more inputs in inputs 105 may receive, at least in part, one or more packets 150. The circuitry 118 replicated, at least in part, at these one or more inputs 105 may be capable, at least in part, of determining, at least in part, one or more outputs (e.g., comprised in one or more of the outputs 107) to which to route the one or more packets 150 in order to permit the one or more packets 150 to be transmitted to one or more inputs of one or more other routers (e.g., one or more routers 104B) that may be the next hop in one or more router networks 106 toward the destination (e.g., PE 102N) of one or more packets 150.

The circuitry 118 replicated, at least in part, at these one or more inputs 105 may make this determination, at least in part, based at least in part upon a plurality of output determinations. These output determinations may include a first output determination and a second output determination. In describing these output determinations, it should be appreciated that the terms "first" and "second" are not intended to necessarily indicate a sequence or occurrence order of these output determinations. For example, without departing from this embodiment, the first output determination may occur, at least in part, before, after, or concurrently with the second output determination, or vice versa. The first output determination may be to select, at least in part, at least one output (e.g., comprised in one or more of the outputs 107), and may be based, at least in part, upon at least one deterministic output selection algorithm. The second output determination may be to select, at least in part, at least one other output (e.g., comprised in one or more of the outputs 107), and may be based, at least in part, upon at least one pseudo-random output selection algorithm. The at least one pseudo-random output selection algorithm may be based, at least in part, upon a counter value.

In this embodiment, a deterministic algorithm may generate, at least in part, one or more outputs based at least in part upon one or more predetermined algorithms and/or one or more predetermined inputs. Also in this embodiment, a pseudo-random algorithm may generate, at least in part, one or more outputs based at least in part upon (1) one or more pseudo-random and/or random algorithms, and/or (2) one or more inputs and/or one or more portions of one or more inputs that are random and/or pseudo-random, at least in part. In this embodiment, a pseudo-random algorithm may be or comprise, at least in part, an algorithm that have an output distribution and/or variation that may permit the algorithm to be useful in an adaptive routing determination. Also in this embodiment, a pseudo-random input may have been generated based at least in part upon one or more algorithms that comprise, at least in part, at least one pseudo-random algorithm. In this embodiment, an adaptive routing determination may be based at least in part upon one or more variables that have one or more values that may vary, at least in part, over time, such as, for example, current loading information, traffic information, and/or pseudo-random input.

Figure 4:
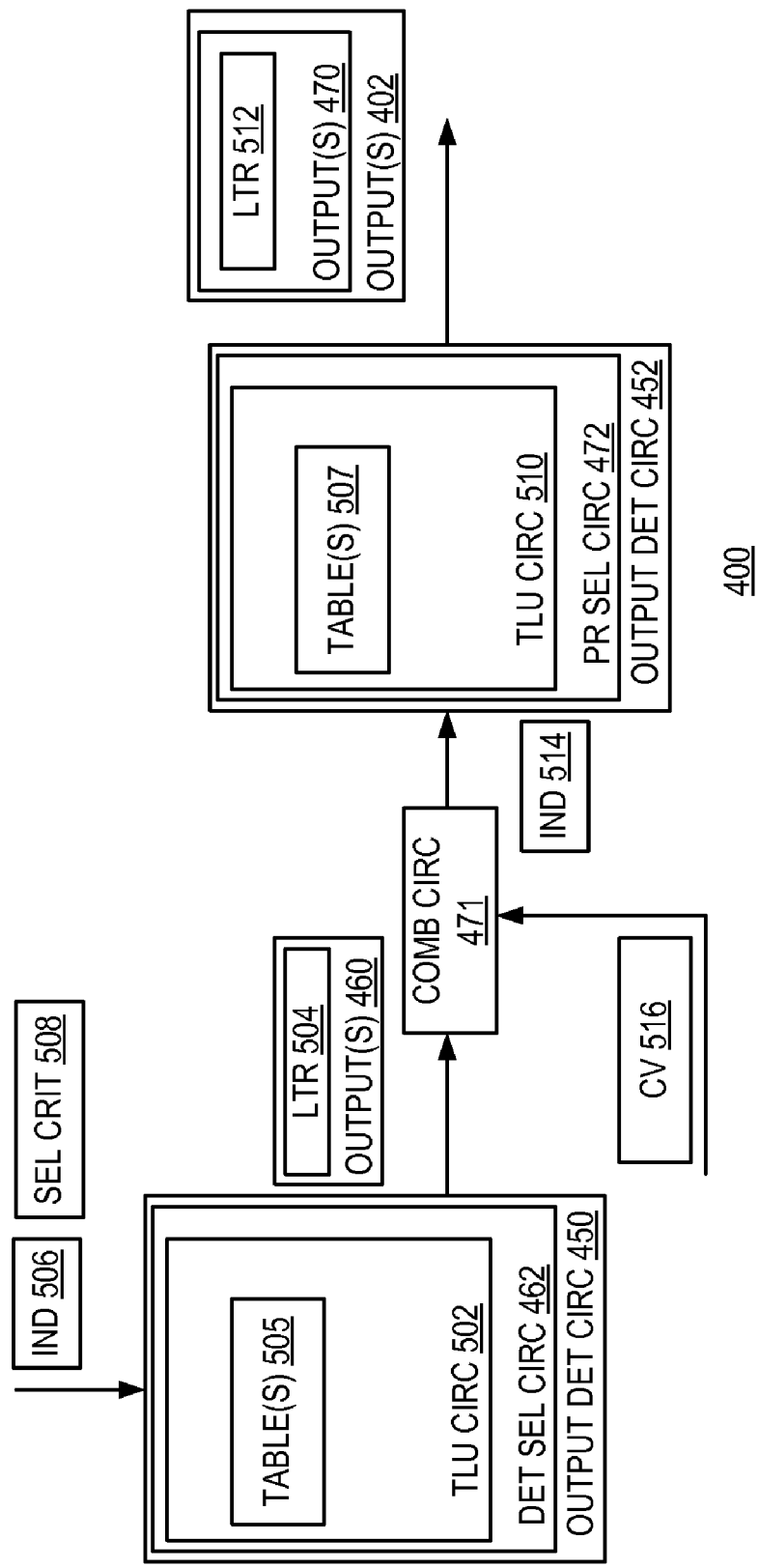
FIG. 4 illustrates features in an embodiment.

For example, in this embodiment, the circuitry 118 replicated, at least in part, at these one or more inputs 105 may include the circuitry 400 shown in FIG. 4. That is, each of the inputs 105 may comprise a respective replicated copy of circuitry 400, at least in part. Circuitry 400 may comprise output determination circuitry 450, combining circuitry 471, and output determination circuitry 452. Output determination circuitry 450 may comprise deterministic output selection circuitry 462. Deterministic output selection circuitry 462 may comprise table lookup (TLU) circuitry 502. Output determination circuitry 452 may comprise pseudo-random output selection circuitry 472. Pseudo-random output selection circuitry 472 may comprise table lookup circuitry (TLU) 510.

In this embodiment, output determination circuitry 450 may receive one or more indices 506 and/or one or more predetermined selection criteria 508. One or more predetermined selection criteria 508 may comprise, for example, at least in part, one or more source addresses (e.g., identifying one or more host processors 12, PE102A, one or more nodes that may comprise one or more of these components of system 100, and/or one or more portions of these components), one or more destination addresses (e.g., identifying one or more host processors comprised in one or more PE 102N, one or more PE 102N, one or more nodes that may comprise one or more of these components of system 100, and/or one or more portions of these components), current network hop and/or location of one or more packets 150, and/or information derived at least in part based upon these one or more addresses (e.g., one or more hashes based at least in part upon these one or more addresses). One or more indices 506 may be based at least in part upon one or more selection criteria 508.

Based at least in part upon one or more indices 506, TLU circuitry 502 may perform one or more table lookup operations involving one or more tables 505. One or more tables 505 may correlate one or more respective possible values of one or more indices 506 with one or more respective corresponding look up table results (LTR). These one or more respective corresponding LTR may be, comprise, and/or indicate, at least in part, one or more portions of one or more addresses of one or more outputs of one or more routers 104A to which packets may be routed, at least in part, to permit the packets to be routed therefrom to one or more next hops toward the packets' respective destinations. For example, TLU circuitry 502 may locate in one or more tables 505 one or more LTR 504 that may correspond, at least in part, to one or more indices 506. Circuitry 462 and/or circuitry 450 may generate, at least in part, one or more outputs 460, based at least in part upon, reflecting, and/or comprising one or more LTR 504. The LTR that may be contained in one or more tables 505 may be predetermined based at least in part upon one or more deterministic routing algorithms, such as, one or more source/destination routing algorithms. Additionally or alternatively, circuitry 462 and/or circuitry 450 may generate, at least in part, one or more outputs 460 based at least in part upon other and/or additional deterministic routing techniques.

Combining circuitry 471 may receive, at least in part, one or more outputs 460 and one or more counter values 516. Circuitry 471 may generate, at least in part, one or more indices 514 based at least in part upon one or more outputs 460 and one or more counter values 516. One or more counter values 516 may be generated by, for example, a not shown counter, combinatory logic, and/or other type of circuitry based, at least in part, upon one or more clock and/or other time-varying signals, and may comprise, at least in part, one or more values that may change as a function, at least in part, of the one or more signals. For example, in this embodiment, one or more counter values 516 may be or comprise one or more values that may be incremented or decremented as a function, at least in part, of one or more clock signals, although many alternatives, variations, and/or modifications are possible without departing from this embodiment. One or more counter values 516 may be propagated, at least in part (after being delayed by a suitable delay, if appropriate), to each of the replicated copies of circuitry 118 in each of the inputs 105.

In this embodiment, circuitry 471 may generate, at least in part, one or more indices 514 such that one or more indices 514 comprises a combination of one or more outputs 460, LTR 504, and/or counter values 516. For example, circuitry 471 may generate, at least in part, one or more indices 514 by concatenating, at least in part, one or more outputs 460, LTR 504, and/or counter values 516. For example, if one or more LTR 504 comprises Q-bits, and one or more counter values 516 comprises B-bits, then the resultant concatenation embodied in one or more indices 514 may comprise Q+B bits. For reasons that will become apparent shortly, B may have a value that is selected such that one or more indices 514 may address a sufficient address space (e.g., in one or more tables 507) to include sufficient alternate routing options to permit collisions in packet routing decisions (e.g., by one or more other replicated copies of circuitry 118 in one or more other respective inputs in inputs 105) to be reduced to below a desired threshold.

Circuitry 452 may receive, at least in part, one or more indices 514. Based at least in part upon one or more indices 514, TLU circuitry 510 may perform one or more table lookup operations involving one or more tables 507. One or more tables 507 may correlate one or more respective possible values of one or more indices 514 with one or more respective corresponding LTR. These one or more respective corresponding LTR may be, comprise, and/or indicate, at least in part, one or more portions of one or more addresses of one or more outputs of one or more routers 104A to which packets may be routed, at least in part, to permit the packets to be routed therefrom to one or more next hops toward the packets' respective destinations. For example, TLU circuitry 510 may locate in one or more tables 507 one or more LTR 512 that may correspond, at least in part, to one or more indices 514. Circuitry 452 and/or circuitry 472 may generate, at least in part, one or more outputs 470, based at least in part upon, and/or comprising one or more LTR 512. Additionally or alternatively, circuitry 452 and/or circuitry 472 may generate, at least in part, one or more outputs 470 based at least in part upon one or more other adaptive and/or pseudo-random routing techniques.

In this embodiment, the circuitry 118 replicated, at least in part, at these one or more inputs 105 may determine, at least in part, to route one or more packets 150 to one or more outputs 402 that are indicated, at least in part, by one or more outputs 470 and/or LTR 512. Thus, in this embodiment, the circuitry 118 replicated, at least in part, at these one or more inputs 105 may determine to route one or more packets 150 to the one or more outputs comprised in one or more outputs 107 that are addressed, at least in part, by one or more outputs 402, outputs 470, and/or LTR 512. This may permit the one or more packets 150 to be transmitted to one or more inputs of one or more other routers (e.g., one or more routers 104B) that may be the next hop in one or more router networks 106 toward the destination (e.g., PE 102N) of one or more packets 150.

By way of example, in this embodiment, if one or more networks 106 comprise one or more folded Clos networks, one half of the links among the routers 104A, 104B, ... 104M in the one or more networks 106 may be network up-links (e.g., to transmit away from the network nodes), and the other half of the links in the one or more networks 106 may be network down-links (e.g., to transmit toward the network nodes). In such an arrangement, if one or more packets 150 are to be propagated via one or more up-links, the one or more packets 150 may be adaptively routed (e.g., in accordance, at least in part, with one or more adaptive routing determinations). Conversely, if one or more packets 150 are to be propagated via one or more down-links, the one or more packets 150 may be deterministically routed (e.g., in accordance, at least in part, with one or more deterministic routing algorithms). Accordingly, the LTR values that may be stored in one or more tables 507 may be selected and correlated with possible values of one or more indices 514 so as to permit this to occur in system 100. Additionally, the address space addressed by one or more indices 514 and the respective size of one or more counter values 516 may be selected so as to permit a sufficient number of alternate routing options to exist for each input. Additionally, the LTR values stored in tables 505, 507 may be selected so as to permit the probability of the circuitry 118 at the input ports 105 selecting one or more colliding output ports to which to route one or more packets to be reduced to below a predetermined threshold. In the case of the LTR values that are intended to implement, at least in part, deterministic routing, this may be accomplished by, for example, generating these LTR values based at least in part upon one or more dispersive routing algorithms. Thus, for example, in this embodiment, the one or more deterministic output selection algorithms implemented, at least in part, by circuitry 462 may implement, at least in part, one or more deterministic routing algorithms that may be or comprise, at least in part, one or more dispersive routing algorithms. In this embodiment, a dispersive routing algorithm may select, at least in part, one or more routes, based at least in part, upon at least one pseudo-random algorithm and one or more routing destinations. Also in this embodiment, the LTR values in tables 505, 507 may be selected so as to permit packets received at different inputs, but destined for transmission to the same respective router, to be transmitted via routes that diverge, at least in part.

Figure 5:
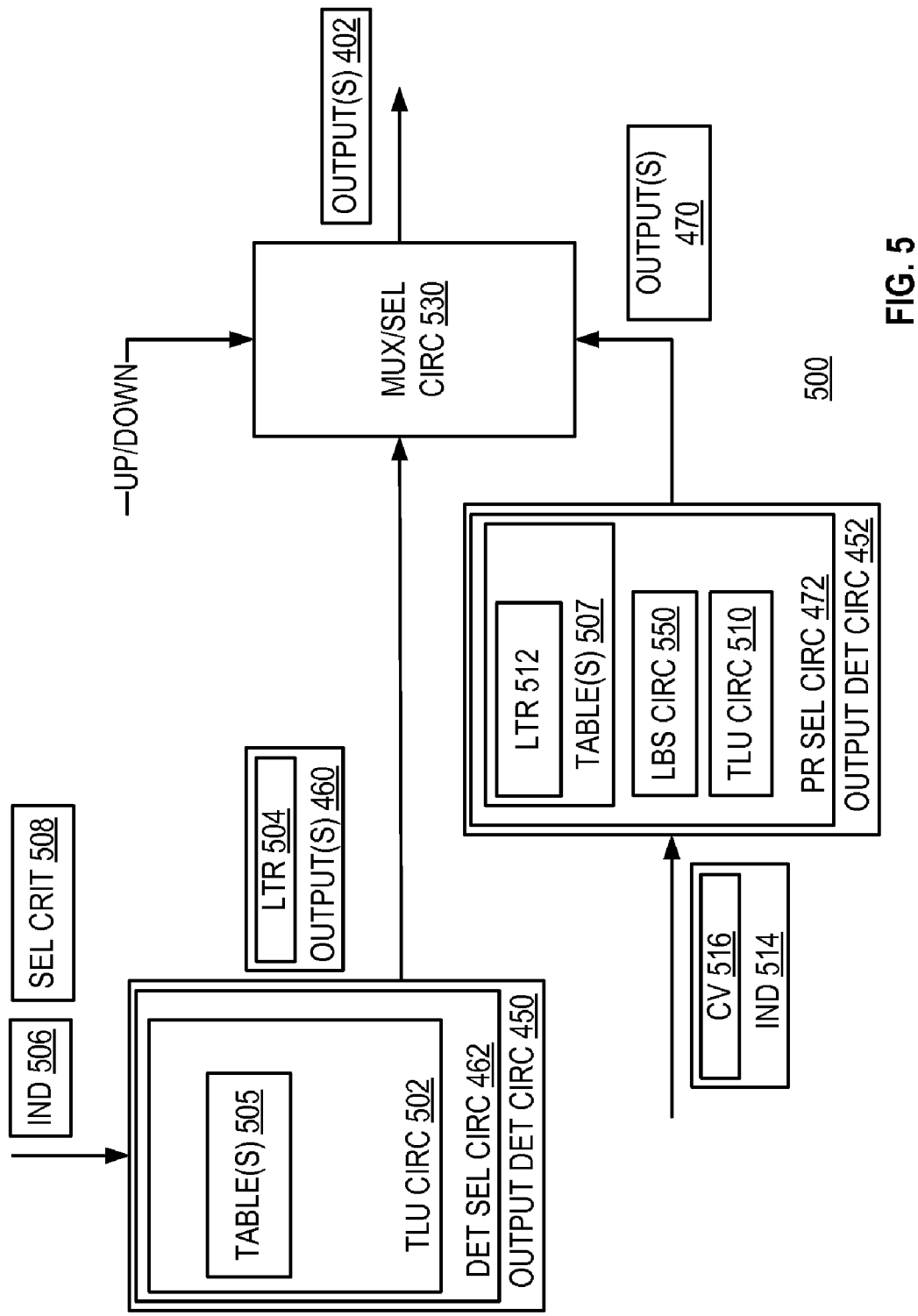
FIG. 5 illustrates features in an embodiment.

FIG. 5 illustrates circuitry 500, which is a variation of circuitry 400 shown in FIG. 4. In circuitry 500, one or more indices 514 may be or may comprise one or more counter values 516. Also, in circuitry 500, one or more outputs 460 and/or one or more LTR 504 selected by circuitry 450, and one or more outputs 470 selected by circuitry 452 may be provided to multiplexer/selector circuitry 530. In circuitry 500, circuitry 472 may comprise load based selection (LBS) circuitry 550. One or more LTR 512 selected, at least in part, by circuitry 510, based at least in part upon one or more indices 514, may indicate, at least in part, one or more (and in this embodiment, a plurality of) outputs (e.g., comprised in outputs 107) to which one or more packets 150 may be routed. LBS circuitry 550 may select, at least in part, among the respective outputs, based at least in part upon one or more load based selection algorithms, and may provide one or more outputs thereby selected to circuitry 530. For example, the one or more load based selection algorithms may select among the respective outputs so as to permit one or more packets 150 to be routed, at least in part, to one or more outputs that currently are experiencing and/or are expected to exhibit the least traffic load. Thus, in this embodiment, the one or more pseudo-random output selection algorithms implemented, at least in part, by circuitry 472 may include, at least in part, the one or more load based selection algorithms implemented, at least in part, by circuitry 550.

Circuitry 530 may select, at least in part, between one or more outputs 460 and one or more outputs 470, to produce one or more outputs 402, based at least in part upon up/down link information. For example, if one or more packets 150 are to be routed, at least in part, via one or more up-links, circuitry 530 may select, as one or more outputs 402, one or more outputs 470. Conversely, if one or more packets 150 are to be routed, at least in part, via one or more down-links, circuitry 530 may select, as one or more outputs 402, one or more outputs 460.

Figure 6:
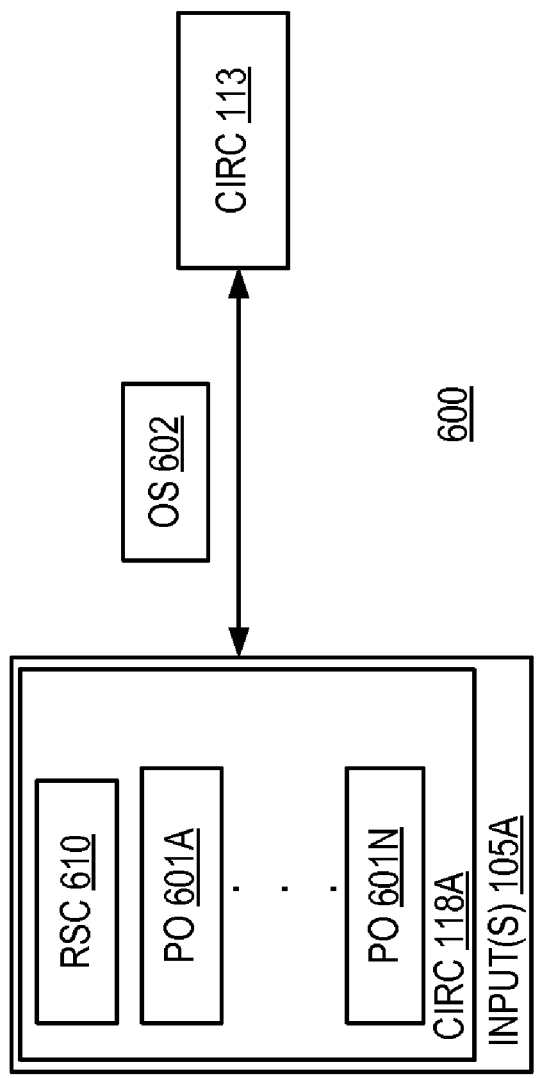
FIG. 6 illustrates features in an embodiment.

Additionally or alternatively, inputs 105 may include circuitry 600 shown in FIG. 6. In circuitry 600, the circuitry 118 that may be replicated, at least in part, at each one (e.g., input 105A) of the inputs 105 may comprise respective circuitry 118A (e.g., comprising, at least in part, circuitry 500 illustrated in FIG. 5) that may be communicatively coupled to the other copies of circuitry 118 (collectively referred by circuitry 113 in FIG. 6) that may be replicated, at least in part, at each of the other inputs 105. Circuitry 118A may store one or more (and in this embodiment, a plurality of) predetermined outputs (PO) 601A ... 601N. Respective of these PO 601A ... 601N may be associated with the inputs 105.

In this embodiment, in the event that the one or more load based selection algorithms implemented by circuitry 550 may be unable to select among two or more outputs indicated, at least in part, by one or more LTR 512 selected by circuitry 510 based upon traffic loading (e.g., as a result of respective traffic loading at these two or more outputs being essentially equal and/or within a predetermined threshold of each other), circuitry 472 and/or circuitry 452 may select one or more of these two or more outputs based at least in part upon which of the one or more PO 600A ... 600N is associated with the one or more inputs that received the one or more packets 150. For example, if one or more PO 600A is associated with these one or more inputs, and one or more PO 600A is indicated, at least in part, by one or more LTR 512, circuitry 452 and/or 472 may select, as one or more outputs 470, one or more PO 600A. In this embodiment, the association among respective of the PO 600A ... 600N and the inputs 105 may change, at least in part, based at least in part upon the one or more counter values 516. Advantageously, this may further reduce probability of selecting colliding outputs.

Additionally, in circuitry 600, prior to actually being carried out by the respective circuitry 118 replicated at the inputs 105, the output selections (OS) 602 made by the respective circuitry 118 may be distributed among the respective circuitry 118. The respective circuitry 118 at each of the respective inputs 105 (e.g., the respective output determination circuitry 452 at each of the respective inputs 105) may compare analyze these output selections 602, and may select (e.g., between one or more respective PO 600A) one or more outputs 402, in a serial fashion with the output selections 602 made by other inputs 105, in such a way as to avoid selecting, as one or more outputs 402, one or more respective outputs 402 that may possibly collide with one or more output selections 602 made by any of the other respective replicated circuitry 118. Advantageously, this may further reduce the probability of selecting colliding outputs, since the respective circuitry 118 may base, at least in part, its selection of one or more outputs 402 upon whether a possible collision may result from its output selection, and may make its output determination in such a way as to avoid such collision.

In practical implementation, the information comprised in OS 602 may include, for example, the respective output selections 602 being made by the inputs 105, the inputs 105 that are making these selections 602, and/or alternative output selections under consideration by these inputs 105. The circuitry 118A may maintain a table (not shown) that may correlate this information in order to permit circuitry 118A to modify its output selections, as appropriate, to avoid collision with other output selections and/or alternative output selections of other replicated circuitry 113.

Additionally or alternatively, circuitry 118A may comprise replicated selection circuitry (RSC) 610. RSC 610 may replicate, at least in part, the output selections 602 made by circuitry 113. Circuitry 118A may base its ultimate output selections, at least in part, upon a portion of the output selections 602, as replicated, at least in part, by circuitry 610. For example, this portion of the output selections 602 may comprise adaptive output selections made by a subset of circuitry 113.

Additionally or alternatively, circuitry 610 may track, at least in part, respective states of outputs 107. For example, in implementation, due to output bandwidth constraints, each of the outputs 107 may release a credit per clock cycle. This may permit a single credit return path (not shown) to be used to return credits from the outputs 107 to the inputs 105. Circuitry 610 may be capable of receiving and keeping track of such credit returns from each of the outputs 107. Such credit return information may be used by circuitry 118A in making its output selections. Advantageously, this may permit distributed/replicated tracking of credit states of the outputs 107 for use in output selection.

Also advantageously, this embodiment may be capable of reducing output selection collisions by (1) coordinating, at least in part, such the output selections and alternative output selections being made by the circuitry 118 replicated at each of the inputs 105 and (2) basing such selections at least in part upon one or more pseudo-random algorithms. Further advantageously, the circuitry 118 replicated at each of the inputs 105 permits such output selections to be made in a distributed fashion at each of the inputs 105.

Figure 7:
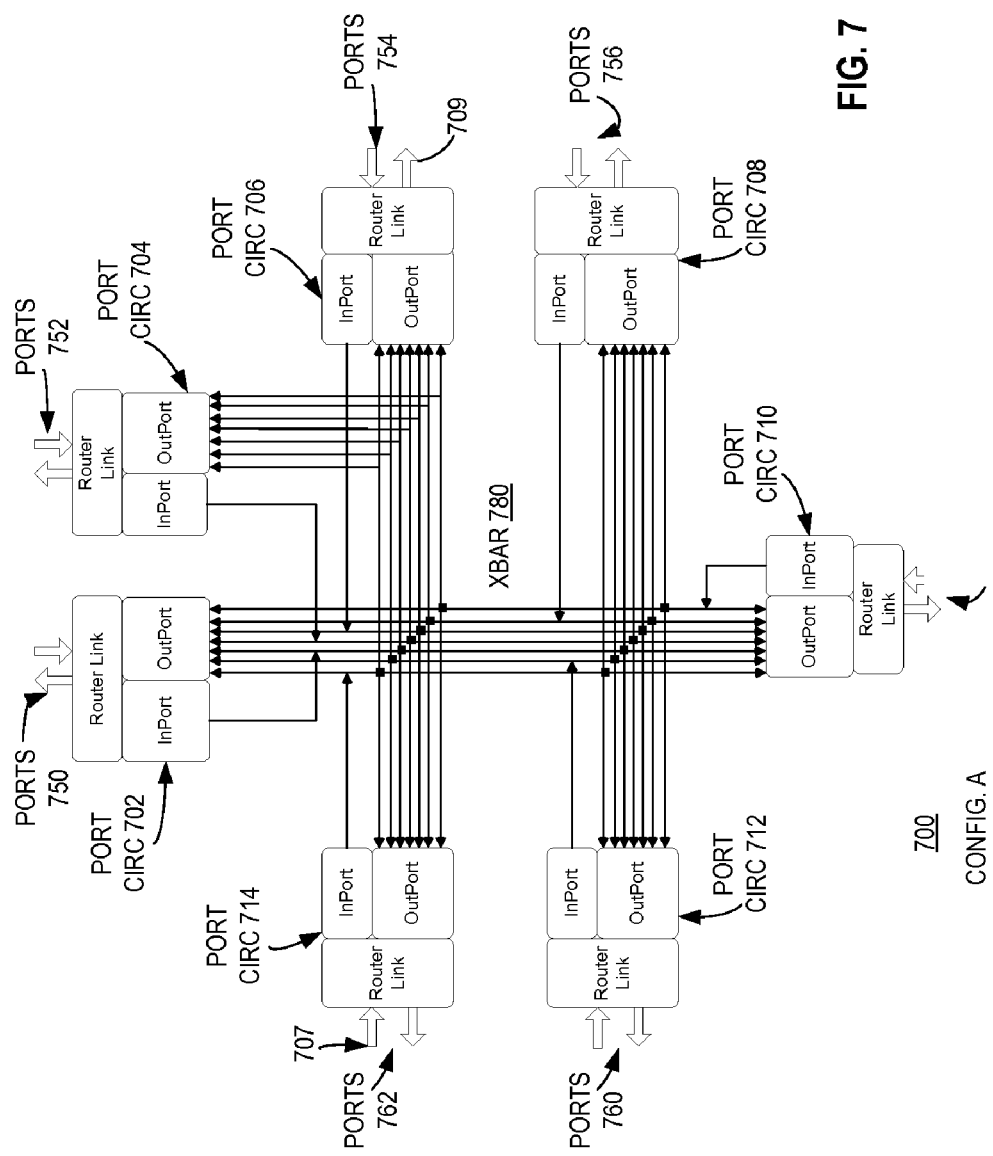
FIG. 7 illustrates features in an embodiment.
Figure 8:
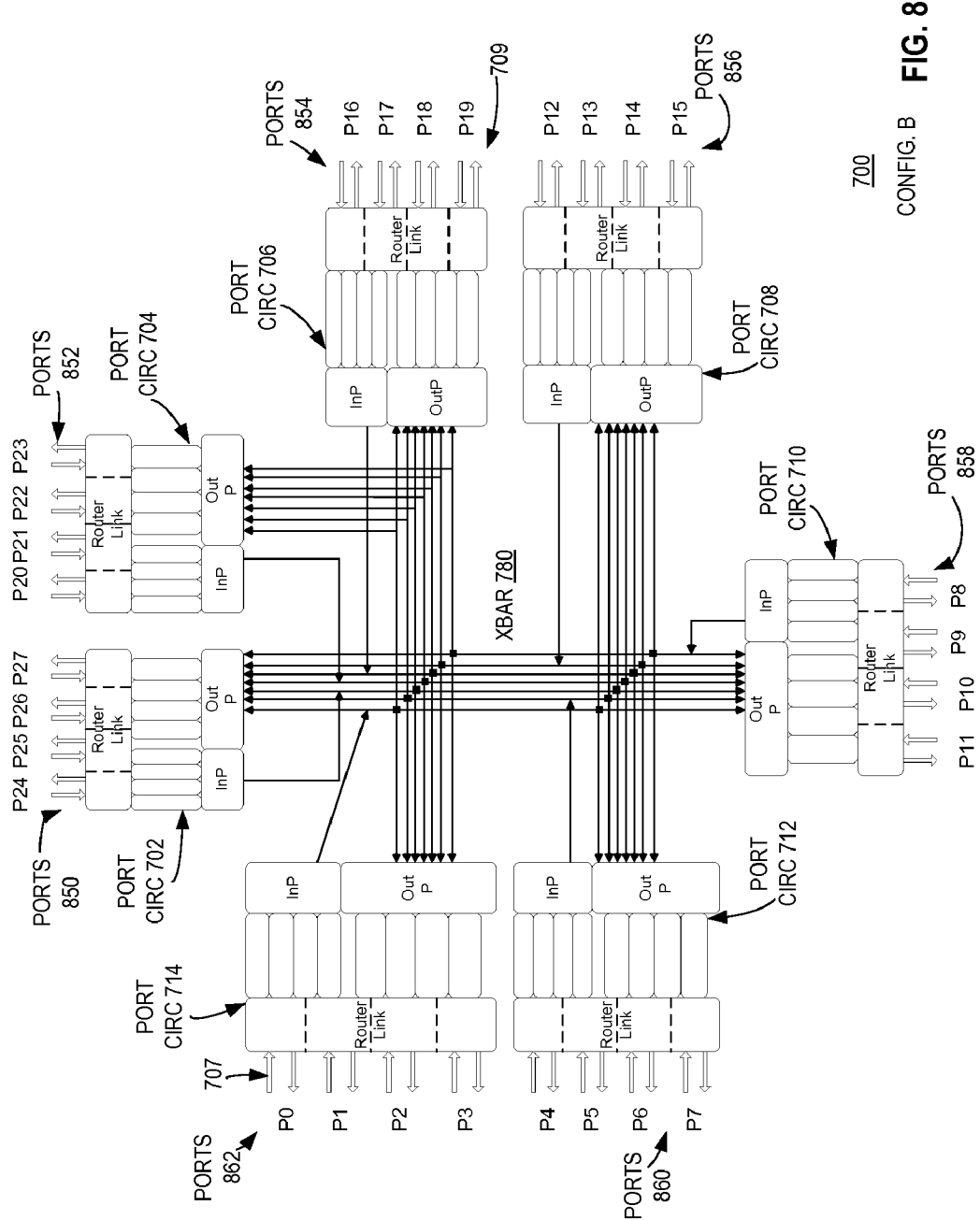
FIG. 8 illustrates features in an embodiment.
Figure 9:
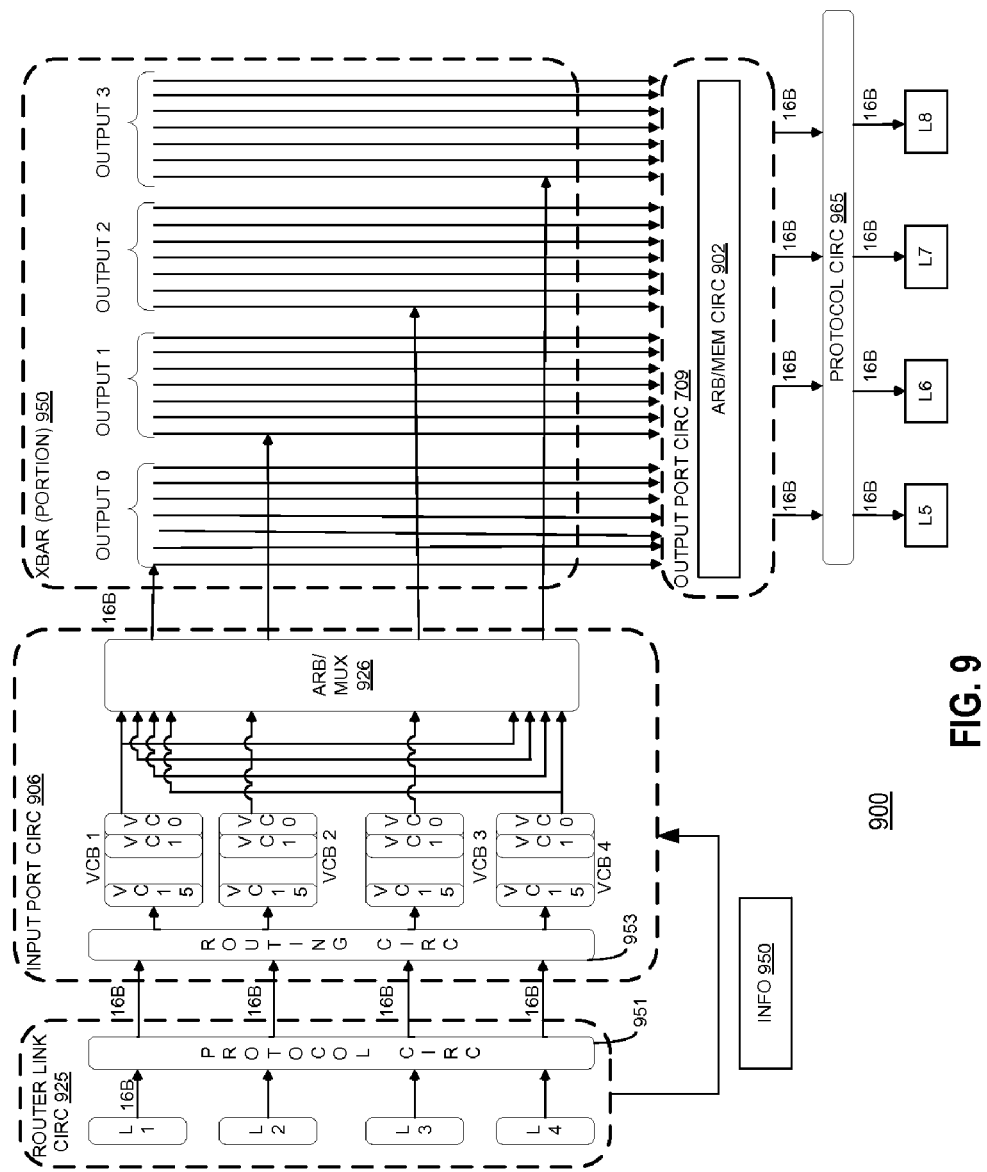
FIG. 9 illustrates features in an embodiment.

Turning now to FIGS. 7-9, circuitry 700 that may be comprised, at least in part, in router circuitry 125 will be described. Circuitry 700 may comprise port circuitry 702, 704, 706, 708, 710, 712, and 714 that may be selectively configurable in one of a plurality of possible configurations. These possible configurations may include, for example, a first possible configuration (CONFIG. A) and a second possible configuration (CONFIG. B). As shown in FIGS. 7 and 8, port circuitry 702, 704, 706, 708, 710, 712, and 714 may be coupled to cross-bar switch circuitry (XBAR) 780.

In the first selectable mode of operation of circuitry 700, the circuitry 700 may have the first configuration. In a second selectable mode of operation of circuitry 700, circuitry 700 may have the second configuration. The first possible configuration is shown in FIG. 7. The second possible configuration is shown in FIG. 8. Control circuitry (not shown) that may be comprised in the router circuitry 125 may select in which of the modes of operation and in which configuration circuitry 700 may operate.

In the first possible configuration (see FIG. 7) and mode of operation, the port circuitry 702, 704, 706, 708, 710, 712, and 714 may include X ports. In the second possible configuration, the port circuitry 702, 704, 706, 708, 710, 712, and 714 may include Y ports. Y may be greater than X. For example, as shown in FIG. 7, in the first configuration, each respective port circuitry 702, 704, 706, 708, 710, 712, and 714 may comprise a single respective pair of ports 750, 752, 754, 756, 758, 760, and 762. As shown in FIG. 7, each of the pairs of ports 750, 752, 754, 756, 758, 760, and 762 may comprise a respective input port and a respective output port. For example, in this first configuration and mode of operation, input port circuitry 707 of port circuitry 714 may comprise and/or operate as a single respective input port (e.g., as indicated by the single arrow entering port circuitry 714). Thus, in the first configuration, each port circuitry 702, 704, 706, 708, 710, 712, and 714 may comprise respective ports: a respective input port and a respective output port. Thus, in the first configuration, port circuitry 702, 704, 706, 708, 710, 712, and 714 may comprise 14 ports, if each input port and output port is considered to be a separate port.

Conversely, as shown in FIG. 8, in the second configuration and mode of operation, each respective port circuitry 702, 704, 706, 708, 710, 712, and 714 may comprise ports 850, 852, 854, 856, 858, 860, and 862, respectively. For example, ports 850 may comprise 4 pairs of input and output ports: P24, P25, P26, and P27. Ports 852 may comprise 4 pairs of input and output ports: P20, P21, P22, and P23. Ports 854 may comprise 4 pairs of input and output ports: P16, P17, P18, and P19. Ports 856 may comprise 4 pairs of input and output ports: P12, P13, P14, and P15. Ports 858 may comprise 4 pairs of input and output ports: P8, P9, P10, and P11. Ports 860 may comprise 4 pairs of input and output ports: P4, P5, P6, and P7. Ports 862 may comprise 4 pairs of input and output ports: P0, P1, P2, and P3. For example, in this second mode of operation and configuration, input port circuitry 707 of port circuitry 714 may comprise and/or operate as a plurality of (e.g., 4) input ports (e.g., as indicated by the four arrows entering the port circuitry 714). Thus, in the second configuration, port circuitry 702, 704, 706, 708, 710, 712, and 714 may comprise 56 ports, if each input port and output port is considered to be a separate port.

For purposes of describing operation of portions of circuitry 700 in the first mode of operation/first configuration and second mode of operation/second configuration, circuitry 900 is illustrated in FIG. 9. Circuitry 900 comprises input port circuitry 906 (that may comprised input port circuitry 714) communicatively coupled to router link circuitry 925. Circuitry 906 may comprise, at least in part, arbitration/multiplexer circuitry 926 that may be coupled to one or more portions 950 of cross-bar circuitry 780. One or more portions 950 of circuitry 780 may be coupled to output port circuitry 709. Output port circuitry 709 may comprise arbitration/memory circuitry 902 that may be coupled to one or more portions 950 of cross-bar circuitry 780 and also to protocol circuitry 965. As will be appreciated by those skilled in the art, appropriate portions of circuitry 900 may be replicated, at least in part, in order to permit, for example, circuitry 700 and/or router 104A to provide at least certain functions and/or operations described herein as being performed by circuitry 700 and/or router 104A.

Router link circuitry 925 may comprise a plurality of (e.g., in this embodiment, 4) data lanes L1, L2, L3, and L4. In this embodiment, each of these data lanes L1, L2, L3, and L4 may be 16 bytes wide, and may be communicatively coupled to protocol/cyclical redundancy check (CRC) circuitry 951. Similarly, in this embodiment, four data lanes (L5, L6, L7, and L8), corresponding to lanes L1, L2, L3, and L4, may be provided from circuitry 902 to protocol circuitry 965, and thence, in exiting circuitry 709.

Circuitry 951 may be communicatively coupled to routing circuitry 953 in input port circuitry 906. Routing circuitry 953 may be communicatively coupled to four virtual channel buffers (VCB1, VCB2, VCB3, and VCB4), each of which buffers may be capable of providing 16 respective virtual channels. The virtual channel buffers VCB1, VCB2, VCB3, and VCB4 may be communicatively coupled to arbitration/multiplexer circuitry 926.

In this example, one or more packets 150 may be received by input port circuitry 906, and may comprise data and control information (e.g., source/destination information). In the configuration/mode of operation shown in FIG. 7, the four lanes L1, L2, L3, and L4 may be pooled to provide and/or operate as single input port that is 64 bytes wide. However, in the configuration/mode of operation shown in FIG. 8, each of the four lanes L1, L2, L3, and L4 may comprise a distinct respective input port that is 18 bytes wide (with 16 bytes of effective data width).

Accordingly, in the configuration/mode of operation shown in FIG. 7, one or more packets 150 may be striped across the four lanes L1, L2, L3, and L4. However, the thus striped data may be operated upon/processed by protocol/CRC circuitry 951 as if the striped data constituted units of 64 bytes, until the one or more packets 150 have been completely received. On this basis, link layer protocol and CRC validation information 950 may be generated, at least in part, by circuitry 951 and this information 950 and associated data from one or more packets 150 may be provided to routing circuitry 953. Once again, as provided to routing circuitry 953 from circuitry 951 this data may be striped across four lanes. However, as was the case with circuitry 951, circuitry 953 may operate upon/process the striped data as if the striped data constituted units of 64 bytes. Circuitry 953 may comprise, for example, at least in part, the circuitry 118 that is replicated at each of the inputs 105. Accordingly, circuitry 953 may determine, at least in part, one or more outputs (e.g., output port circuitry 709) to which to route one or more packets 150, based at least in part upon control information (source information, destination information, etc.) that may be comprised in one or more packets 150, in accordance with the teachings described herein (e.g., in connection with FIGS. 4-6). Circuitry 953 may assign the contents of one or more packets 150 and/or respective information associated therewith to one or more respective virtual channels comprised in VCB1, VCB2, VCB3, and/or VCB4. Such respective information may be or comprise, for example, error correction code information, virtual channel identification information, output port credit information, and/or virtual channel credit information. Such respective information may be generated, at least in part, by routing circuitry 953 based, at least in part upon information 950 and/or contents of one or more packets 150. Router circuitry 953 may appropriately control, at least in part, circuitry 926 to direct circuitry 926 to arbitrate among the virtual channels in VCB1, VCB2, VCB3, and VCB4 so as to selectively transmit the respective data of one or more packets 150 and the respective information associated therewith, from the one or more virtual channels to which they are assigned, to the output port circuitry 709, via the one or more portions 950 of the cross-bar 780. This may result in the respective data of one or more packets 150 and the respective information associated therewith being received by circuitry 902 of output port circuitry 709.

Based at least in part upon this respective information, circuitry 902 may selectively reassemble the contents of the one or more packets 150 and provide the contents to protocol circuitry 965, which may then transmit the contents from the router 104A striped across lanes L5, L6, L7, and L8. As was the case with circuitry 951, circuitry 902 and/or circuitry 965 may operate upon/process the striped data as if the striped data constituted units of 64 bytes.

Conversely, in the configuration/mode of operation shown in FIG. 8, each of the four lanes L1, L2, L3, and L4 may operate as a respective input port lane. Accordingly, respective data received via these respective lanes may be operated upon/processed by protocol/CRC circuitry 951 as independent, respective channels of 16 bytes each, instead of being processed in units of 64 bytes as is the case in the mode of operation shown in FIG. 7. On this basis, link layer protocol and CRC validation information 950 may be generated, at least in part, by circuitry 951 and this information 950 and respective data from these independent channels may be provided to routing circuitry 953. Circuitry 953 may assign the respective data from these independent lanes and/or respective information associated therewith (of the types described previously) to one or more respective virtual channels comprised in VCB1, VCB2, VCB3, and/or VCB4. Router circuitry 953 may appropriately control, at least in part, circuitry 926 to direct circuitry 926 to arbitrate among the virtual channels in VCB1, VCB2, VCB3, and VCB4 so as to selectively transmit the respective data and the respective information associated therewith, from the one or more virtual channels to which they are assigned, to the output port circuitry 709, via the one or more portions 950 of the cross-bar 780. This may result in the respective data and the respective information associated therewith being received by circuitry 902 of output port circuitry 709.

Based at least in part upon this respective information, circuitry 902 may selectively reassemble the respective contents of the individual lanes L1, L2, L3, and L4, and may provide the respective contents to protocol circuitry 965. Circuitry 965 may then transmit the respective contents from the router 104A via corresponding lanes L5, L6, L7, and L8.

Thus, in the mode of operation/configuration shown in FIG. 7, the input port circuitry 714 comprises and operates as a single input port that is 64 bytes wide. However, in the mode of operation/configuration shown in FIG. 8, the input port circuitry 714 comprises and operates as four independent input ports, and each of these four independent input ports is respectively one fourth the size of the single respective port of mode of operation of FIG. 7 (i.e., 16 bytes wide).

Thus, in this embodiment, the same respective physical components (e.g., data paths, port circuitry, cross-bar, and multiplexing/arbitration circuitry) may be used in both modes of operation. However, the two respective configurations and modes of operation may selectively utilize these physical components differently, at least in part, to permit a router in this embodiment to be able to have different port counts and/or configurations. Advantageously, this may permit a router in this embodiment to be selectively used in multiple network topologies that may differ at least in part from each other. Further advantageously, the port arbitration, router link, and protocol circuitry of this embodiment may reduce buffer memory and/or utilize link level encoding efficiently, without significantly impacting processing latency.

In this embodiment, the circuitry 118 that is replicated, at least in part, at the inputs 105 may be capable of implementing, at least in part, one or more torus routing algorithms. In this embodiment, a torus routing algorithm may be or comprise, at least in part, one or more algorithms to route, at least in part, one or more packets through at least one portion of a torus network. In this embodiment, a torus network or torus may be used interchangeably, and may comprise a mesh network that has at least two end nodes that are communicatively coupled together in at least two mesh dimensions. Although an embodiment will be described in use in a two-dimensional torus, it should be appreciated that the teachings of this embodiment may be utilized in a three-dimensional or higher dimensional torus. Also, it should be appreciated that the number, sizes, widths, configurations, and types of lanes, channels, ports, nodes, routers, and/or connections between and/or among routers described herein (e.g., in connection with the arrangements illustrated in FIGS. 7 to 9) are for purposes example, and may vary without departing from this embodiment.

Figure 10:
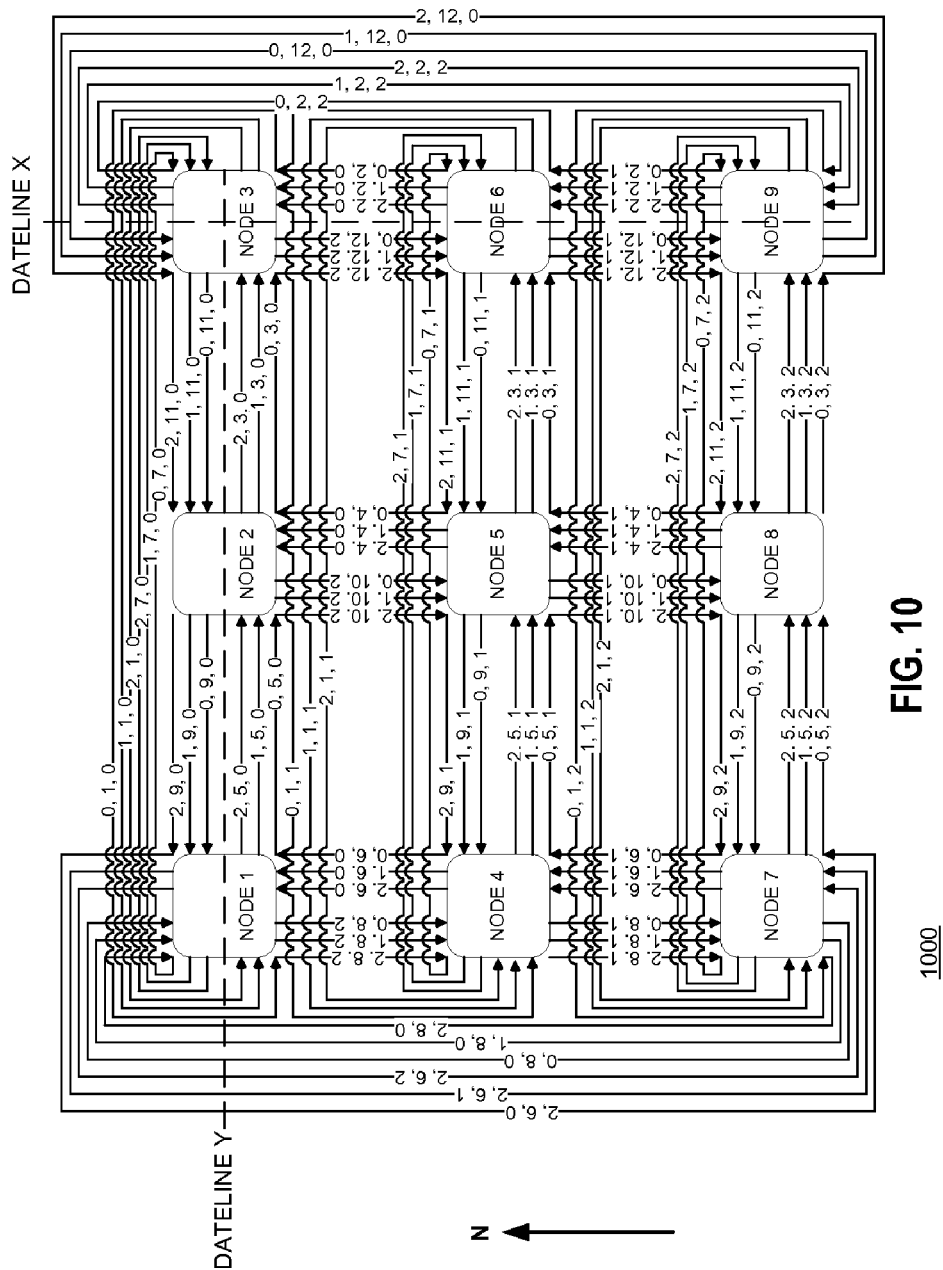
FIG. 10 illustrates features in an embodiment.

In this embodiment, the routers 104A . . . 104M and/or router networks 202A . . . 202Z may be configured so to as to form (e.g., logically and/or physically) one or more torus networks 1000 (see FIG. 10). It should be noted that one or more torus networks 1000 may comprise a not shown wrap-around channel in the center column. However, such channel has been omitted from FIG. 10 for clarity of illustration. The circuitry 125 and/or 118 that may be comprised in each of the routers 104A . . . 104M may be capable of implementing, at least in part, one or more torus routing algorithms. For example, circuitry 118 that is replicated, at least in part, at inputs 105 may determine, at least in part, one or more outputs 402 based, at least in part, upon the one or more torus routing algorithms.

In this embodiment, the one or more torus routing algorithms may comprise, for example, one or more deterministic and/or adaptive routing algorithms. The deterministic and adaptive routing algorithms may be capable of assigning respective packet traffic to at least one common subset of virtual channels. For example, in this embodiment, all virtual channels may be available to receive traffic assigned by the one or more deterministic routing algorithms. Also, for example, concurrently, in this embodiment, all virtual channels may be available to receive traffic assigned by the one or more adaptive routing algorithms. Thus, in this embodiment, the common subset of virtual channels may comprise the entire set of virtual channels that are present in the torus 1000. However, without departing from this embodiment, the common subset of virtual channels that may be available for assignment by both the deterministic and adaptive routing algorithms may comprise fewer virtual channels than this. In this embodiment, the number of virtual channels may be equal to the number of dimensions of the torus plus one. Thus, for example, in the two-dimensional torus 1000, the number of virtual channels may be equal to 3.

In this embodiment, the one or more deterministic routing algorithms may be or comprise, at least in part, one or more dispersive routing algorithms. These one or more dispersive routing algorithms may be based at least in part upon one or more sources of one or more packets being routed, one or more destinations of the one or more packets, current router/hop, one or more hops remaining to be taken by the one or more packets in order to reach the one or more destinations, and/or information obtained, at least in part, from one or more look up table operations (e.g., involving one or more tables 505, 507, and/or one or more not shown other and/or additional tables, for example, that define permitted torus routing turns). For example, the one or more deterministic algorithms may select a next hop port based at least in part upon one or more hashes of source, destination, and/or current hop/router information. The one or more hashes may be used to access one or more not shown tables defining permissible torus routing, including, for example, permissible turns for use in the routing. These permitted torus turns may be defined in accordance with techniques generally described in Glass et al., "The Turn Model for Adaptive Routing," Proceedings of the 19$^{th}$ Annual International Symposium on Computer Architecture, May 1992, pp. 278-287 (hereinafter "Glass et al."), although many alternatives are possible without departing from this embodiment. A similar process may be utilized to select permitted torus turns for use in adaptive routing in this embodiment. However, in such adaptive routing, one or more permitted turns having lowest traffic load may be selected.

Routing according to the one or more torus routing algorithms may be, at least in part, in accordance with the following. After a packet (e.g., one or more packets 150) enters an initial node's router, the circuitry 118 at the one or more inputs 105 of the router receiving the packet may assign the packet to an initial virtual channel, in accordance with the preceding teachings, based at least in part upon the source and/or destination of the packet. If, as a result of the route assigned to the packet, the packet may traverse one or more datelines (see FIG. 10) a number of times that is equal to the number of torus dimensions (in this case, 2), the packet may be assigned to the highest numbered virtual channel (e.g., VC 2). Conversely, as a result of the route assigned to the packet, the packet may traverse one or more datelines a number of times that is one less than the number of torus dimensions, the packet may be assigned to the next highest numbered virtual channel (e.g., VC 1), and so forth, depending upon the number of torus dimensions, dateline crossings, etc. If a subsequent dateline router receives the packet in a given virtual channel (e.g., VC 2) in that dateline dimension, that router may re-assign the packet to a virtual channel that is the next highest in rank order (e.g., VC 1) compared to the given virtual channel.

In this example, east-to-south and/or north-to-west torus turns may not be permitted, and permitted routes may not traverse from a lower numbered channel to a higher numbered channel. Examples of possible virtual channel numberings are illustrated in FIG. 10, with each possible numbering being designed by a three value tuple whose first value designates the virtual channel and the remaining two values designing the physical channel. The values in each tuple may be concatenated to obtain the total value to be used in the virtual channel numbering scheme of this embodiment. The two values that designate the physical channel do so by specifying a horizontal value that descends west-to-east for eastbound and northbound channel, and a vertical value that descends north-to-south for southbound channels and south-to-north for other channels. For example, in the tuple "0, 3, 2" in FIG. 10, "0" is the virtual channel, "3" is the horizontal value, and "2" is the vertical value.

In this embodiment, each torus dimension may include a respective dateline, and in adaptive routing, one or more torus crossings may be permitted. For purposes of routing, crossing a respective dateline may be treated as a dimension reversal (e.g., generally in accordance with in Dally et al., "Deadlock-Free Adaptive Routing In Multicomputer Networks Using Virtual Channels," IEEE Transactions on Parallel and Distributed Systems, Vol. 4, No. 4, April 1993, pages 466-475, hereinafter "Dally et al.") and the virtual channel number may be decremented. However, in this embodiment, the usage of such decrementing of the virtual channel number, when a dateline is crossed, may be different from the manner in which the decrementing of a virtual channel may be employed in Dally et al. (e.g., when an illegal change of dimension occurs). As a result, at least in part, of the adaptive routing that may be allowed, the maximum number of datelines that may be crossed may be equal to the number of torus dimensions. This may permit significantly more flexible minimal adaptive routing to be employed in this embodiment than is employed in Glass et al. and Dally et al.

As result, at least in part, of solving torus limitations of the turn model routing scheme in this embodiment, the turn model may be employed, at least in part, to generate basic routing rules in this embodiment. The turn model may define an algorithmic set of relatively easily detectable illegal turns and/or dateline crossings. This may permit an algorithmic dispersive routing scheme to be employed in this embodiment that may be capable of achieving improved results that heretofore may only have been possible to achieve by adaptive routing. In order to reduce the possible effects of dimension ordered or direction ordered (e.g., positive first) routing (e.g., potential head of line blocking when traffic flow in given dimension is blocked), deterministic dispersive routing may instead be employed to provide increased routing choices at a given input port. In this embodiment, such deterministic dispersive routing may comprise, at least in part, one or more dispersive routing algorithms of the type described previously.

The deterministic dispersive routing in this embodiment may be freer than dimension ordered routing, "positive first" routing, and/or other turn-model routing techniques. Additionally, all (or at least a common subset) of the virtual channels in this embodiment may be available for use in both adaptive and deterministic routing. Additionally, in this embodiment, adaptive routing may utilize an unlimited number of dimension reversals and all torus connections. Advantageously, these features may permit routing in this embodiment to be more flexible, freer, less subject to blocking, collision, and/or congestion, and simpler to implement.

Figure 3:
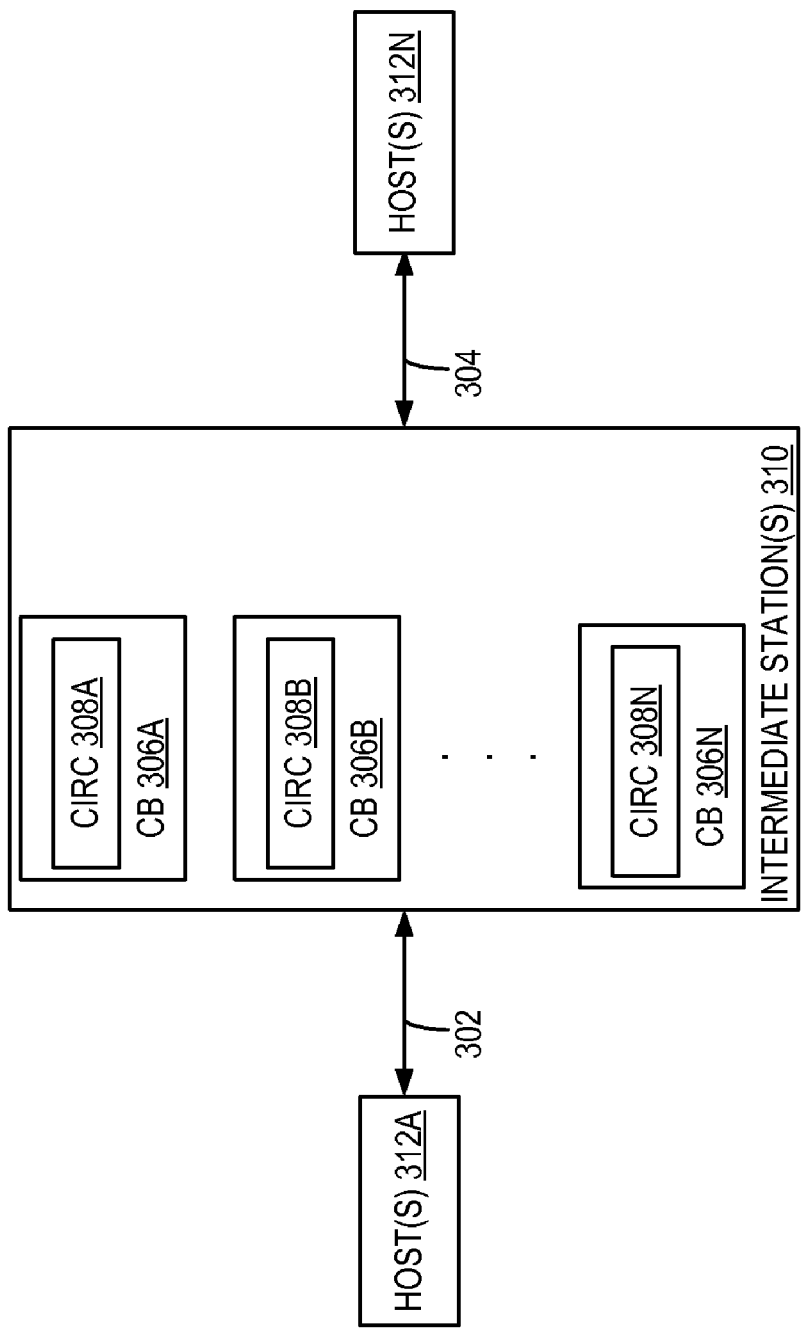
FIG. 3 illustrates features in an embodiment.

Alternatively or additionally, circuitry 118, circuitry 125, one or more routers 104A, one or more router networks 202A, and/or one or more router networks 106 may be comprised, at least in part, in one or more of circuitry 308A, 308B, . . . 308N (see FIG. 3). As shown in FIG. 3, circuitry 308A, 308B, . . . 308N may be comprised, at least in part, in one or more circuit boards (CB) 306A, 306B, . . . 306N, respectively, that may be comprised, at least in part, in one or more intermediate stations 310. One or more intermediate stations 310 may be communicatively coupled via one or more network segments 302 to one or more hosts 312A, and via one or more network segments 304 to one or more hosts 312N. For example, in this embodiment, circuitry 308A . . . 308N may provide, at least in part, one or more switching and/or routing functions to permit one or more packets 150 to be forwarded and/or routed, at least in part, from one or more hosts 312A to one or more hosts 312N via segments 302 and 304. Many other variations, alternatives, and modifications are possible without departing from this embodiment.

Thus, an embodiment may include circuitry to determine, at least in part, at least one first output to which to route at least one packet, based, at least in part upon, a first output determination and a second output determination. The first output determination may select at least one second output based at least in part upon at least one deterministic output selection algorithm. The second output determination may select at least one third output based at least in part upon at least one pseudo-random output selection algorithm. The at least one pseudo-random output selection algorithm may be based, at least in part, upon a counter value.

Many variations, modifications, and alternatives are possible without departing from this embodiment. Accordingly, this embodiment should be viewed broadly as encompassing all such alternatives, modifications, and alternatives.

What is claimed is:
1. An apparatus comprising:
circuitry to determine, at least in part, at least one first output to which to route at least one packet, based, at least in part upon, a first output determination and a second output determination, the first output determination being used to select at least one second output based at least in part upon at least one deterministic output selection algorithm, the second output determination being used to select at least one third output based at least in part upon at least one pseudo-random output selection algorithm, the at least one pseudo-random output selection algorithm being based, at least in part, upon a counter value; and
an intermediate station comprising the circuitry, the intermediate station to be communicatively coupled to a plurality of end stations.
2. The apparatus of claim 1, wherein:
the apparatus comprises inputs; and
the apparatus satisfies at least one of the following subparagraphs (a) to (e):
  (a) the at least one deterministic output algorithm comprises a first table lookup to generate a first lookup table result based at least in part upon a first index that is based at least in part upon at least one predetermined selection criterion, the at least one pseudo-random output selection algorithm comprises a second table lookup to generate a second lookup table result based at least in part upon a second index that is based at least in part upon the counter value, the counter value being replicated at the inputs;
  (b) the circuitry is to select between the at least one second output and the at least one third output to produce the at least one first output;
  (c) the at least one pseudo-random output selection algorithm also comprises a load based selection among respective outputs indicated, at least in part, by the second lookup table result;
  (d) the second index comprises a combination, at least in part, of the first lookup table result and the counter value; and
  (e) the circuitry at a given input is to select the at least one first output based at least in part upon at least one of one or more predetermined outputs whose selection by the circuitry at the given input is preferred and possible collision with other output selections made by the circuitry at other inputs.
3. The apparatus of claim 1, wherein:
the circuitry comprises port circuitry that is selectively configurable in a selected configuration, the selected configuration being selected from possible configurations that include a first possible configuration and a second possible configuration, the first possible configuration including N ports, the second possible configuration including M ports, N and M being respective positive integers, N being greater than M.

4. The apparatus of claim 1, wherein:
the circuitry comprises arbitration circuitry to selectively couple at least one input port channel to at least one output port;
the circuitry comprises input port circuitry;
in one mode of operation, the input port circuitry comprises a single input port; and
in another mode of operation, the input port circuitry operates as a plurality of input ports.

5. The apparatus of claim 4, wherein:
the arbitration circuitry is to arbitrate among a plurality of channels so as to selectively transmit respective data and respective information associated with the plurality of channels, the respective information comprising respective error correction code, channel identification, and channel credit information.

6. The apparatus of claim 1, wherein:
the circuitry is to determine the at least one first output based at least in part upon a torus routing algorithm that implements, at least in part, deterministic and adaptive routing algorithms, the deterministic and the adaptive routing algorithms being capable of assigning traffic to at least one common subset of virtual channels, the deterministic routing algorithm being, at least in part, a dispersive routing algorithm.

7. The apparatus of claim 6, wherein:
the dispersive routing algorithm is based at least in part upon at least one of:
source of the at least one packet;
destination of the at least one packet;
current location of the at least one packet;
one or more remaining hops to be taken by the at least one packet; and
information obtained, at least in part, by one or more table lookup operations.

8. A method comprising:
determining, at least in part, by circuitry at least one first output to which to route at least one packet, based, at least in part, upon a first output determination and a second output determination, the first output determination being used to select at least one second output based at least in part upon at least one deterministic output selection algorithm, the second output determination being used to select at least one third output based at least in part upon at least one pseudo-random output selection algorithm, the at least one pseudo-random output selection algorithm being based, at least in part, upon a counter value; and wherein:
an intermediate station comprises the circuitry, the intermediate station to be communicatively coupled to a plurality of end stations.

9. The method of claim 8, wherein:
the method satisfies at least one of the following sub-paragraphs (a) to (e):
(a) the at least one deterministic output algorithm comprises a first table lookup to generate a first lookup table result based at least in part upon a first index that is based at least in part upon at least one predetermined selection criterion, the at least one pseudo-random output selection algorithm comprises a second table lookup to generate a second lookup table result based at least in part upon a second index that is based at least in part upon the counter value, the counter value being replicated at inputs;
(b) the circuitry is to select between the at least one second output and the at least one third output to produce the at least one first output;
(c) the at least one pseudo-random output selection algorithm also comprises a load based selection among respective outputs indicated, at least in part, by the second lookup table result;
(d) the second index comprises a combination, at least in part, of the first lookup table result and the counter value; and
(e) the circuitry at a given input is to select the at least one first output based at least in part upon at least one of one or more predetermined outputs whose selection by the circuitry at the given input is preferred and possible collision with other output selections made by the circuitry at other inputs.

10. The method of claim 8, wherein:
the circuitry comprises port circuitry that is selectively configurable in a selected configuration, the selected configuration being selected from possible configurations that include a first possible configuration and a second possible configuration, the first possible configuration including N ports, the second possible configuration including M ports, N and M being respective positive integers, N being greater than M.

11. The method of claim 8, wherein:
the circuitry comprises arbitration circuitry to selectively couple at least one input port channel to at least one output port;
the circuitry comprises input port circuitry;
in one mode of operation, the input port circuitry comprises a single input port; and
in another mode of operation, the input port circuitry operates as a plurality of input ports.

12. The method of claim 11, wherein:
the arbitration circuitry is to arbitrate among a plurality of channels so as to selectively transmit respective data and respective information associated with the plurality of channels, the respective information comprising respective error correction code, channel identification, and channel credit information.

13. The method of claim 8, wherein:
the circuitry is to determine the at least one first output based at least in part upon a torus routing algorithm that implements, at least in part, deterministic and adaptive routing algorithms, the deterministic and the adaptive routing algorithms being capable of assigning traffic to at least one common subset of virtual channels, the deterministic routing algorithm being, at least in part, a dispersive routing algorithm.

14. The method of claim 13, wherein:
the dispersive routing algorithm is based at least in part upon at least one of:
source of the at least one packet;
destination of the at least one packet;
current location of the at least one packet;
one or more remaining hops to be taken by the at least one packet; and
information obtained, at least in part, by one or more table lookup operations.

15. Computer-readable non-transitory memory storing instructions that when executed by a machine result in operations comprising:
determining, at least in part, by circuitry at least one first output to which to route at least one packet, based, at least in part, upon a first output determination and a second output determination, the first output determination being used to select at least one second output based at least in part upon at least one deterministic output selection algorithm, the second output determination being used to select at least one third output based at least in part upon at least one pseudo-random output selection algorithm, the at least one pseudo-random output selection algorithm being based, at least in part, upon a counter value; and wherein:

an intermediate station comprises the circuitry, the intermediate station to be communicatively coupled to a plurality of end stations.

16. The memory of claim 15, wherein:
the memory further satisfies at least one of the following sub-paragraphs (a) to (e):
(a) the at least one deterministic output algorithm comprises a first table lookup to generate a first lookup table result based at least in part upon a first index that is based at least in part upon at least one predetermined selection criterion, the at least one pseudo-random output selection algorithm comprises a second table lookup to generate a second lookup table result based at least in part upon a second index that is based at least in part upon the counter value, the counter value being replicated at inputs;
(b) the operations comprise selecting between the at least one second output and the at least one third output to produce the at least one first output;
(c) the at least one pseudo-random output selection algorithm also comprises a load based selection among respective outputs indicated, at least in part, by the second lookup table result;
(d) the second index comprises a combination, at least in part, of the first lookup table result and the counter value; and
(e) the operations comprise selecting at a given input the at least one first output based at least in part upon at least one of one or more predetermined outputs whose selection at the given input is preferred and possible collision with other output selections made at other inputs.

17. The memory of claim 15, wherein:
the operations also comprise selectively configuring port circuitry in a selected configuration, the selected configuration being selected from possible configurations that include a first possible configuration and a second possible configuration, the first possible configuration including N ports, the second possible configuration including M ports, N and M being respective positive integers, N being greater than M.

18. The memory of claim 15, wherein:
the operations comprise using arbitration circuitry to selectively couple at least one input port channel to at least one output port;
the circuitry comprises input port circuitry;
in one mode of operation, the input port circuitry comprises a single input port; and
in another mode of operation, the input port circuitry operates as a plurality of input ports.

19. The memory of claim 18, wherein:
the arbitration circuitry is to arbitrate among a plurality of channels so as to selectively transmit respective data and respective information associated with the plurality of channels, the respective information comprising respective error correction code, channel identification, and channel credit information.

20. The memory of claim 15, wherein:
the operations also comprise making a determination of the at least one first output based at least in part upon a torus routing algorithm that implements, at least in part, deterministic and adaptive routing algorithms, the deterministic and the adaptive routing algorithms being capable of assigning traffic to at least one common subset of virtual channels, the deterministic routing algorithm being, at least in part, a dispersive routing algorithm.

21. The memory of claim 13, wherein:
the dispersive routing algorithm is based at least in part upon at least one of:
source of the at least one packet;
destination of the at least one packet;
current location of the at least one packet;
one or more remaining hops to be taken by the at least one packet; and
information obtained, at least in part, by one or more table lookup operations.

* * * * *